United States Patent [19]

Ecker et al.

[11] Patent Number: 4,655,362

[45] Date of Patent: Apr. 7, 1987

[54] MANIPULATOR FOR COVER CLOSURE MEMBERS

[75] Inventors: Karl-Heinz Ecker, Erkelenz; Helmut Henschenmacher, Brachelen, both of Fed. Rep. of Germany

[73] Assignee: Wirth Maschinen- und Bohrgerate Fabrik GmbH, Erkelenz, Fed. Rep. of Germany

[21] Appl. No.: 853,151

[22] Filed: Apr. 17, 1986

[30] Foreign Application Priority Data

Apr. 19, 1985 [DE] Fed. Rep. of Germany ... 8511617[U]

[51] Int. Cl.[4] ............................................ B65D 43/14
[52] U.S. Cl. ................................................ 220/260
[58] Field of Search ............... 220/260, 211, 262, 263, 220/332; 49/199, 205, 340

[56] References Cited

U.S. PATENT DOCUMENTS

| 2,639,601 | 5/1953 | Miller | 220/211 |
| 2,867,329 | 1/1959 | Miller | 49/340 |
| 3,773,311 | 11/1973 | Poe et al. | 49/205 |
| 4,119,238 | 10/1978 | Jáafar et al. | 220/211 |
| 4,334,633 | 6/1982 | Piegza | 49/199 |
| 4,518,095 | 5/1985 | Engwert | 220/260 |

Primary Examiner—George T. Hall
Attorney, Agent, or Firm—Holman & Stern

[57] ABSTRACT

A manipulator for parts which are to be moved during the opening and closing of an orifice provided with a cover comprises a driving device for moving a support along a guide parallel to the central axis of the orifice. A path-translating transmission is provided between the driving device and the support so that the stroke length of the driving device is shorter than the resultant path of the support.

6 Claims, 1 Drawing Figure

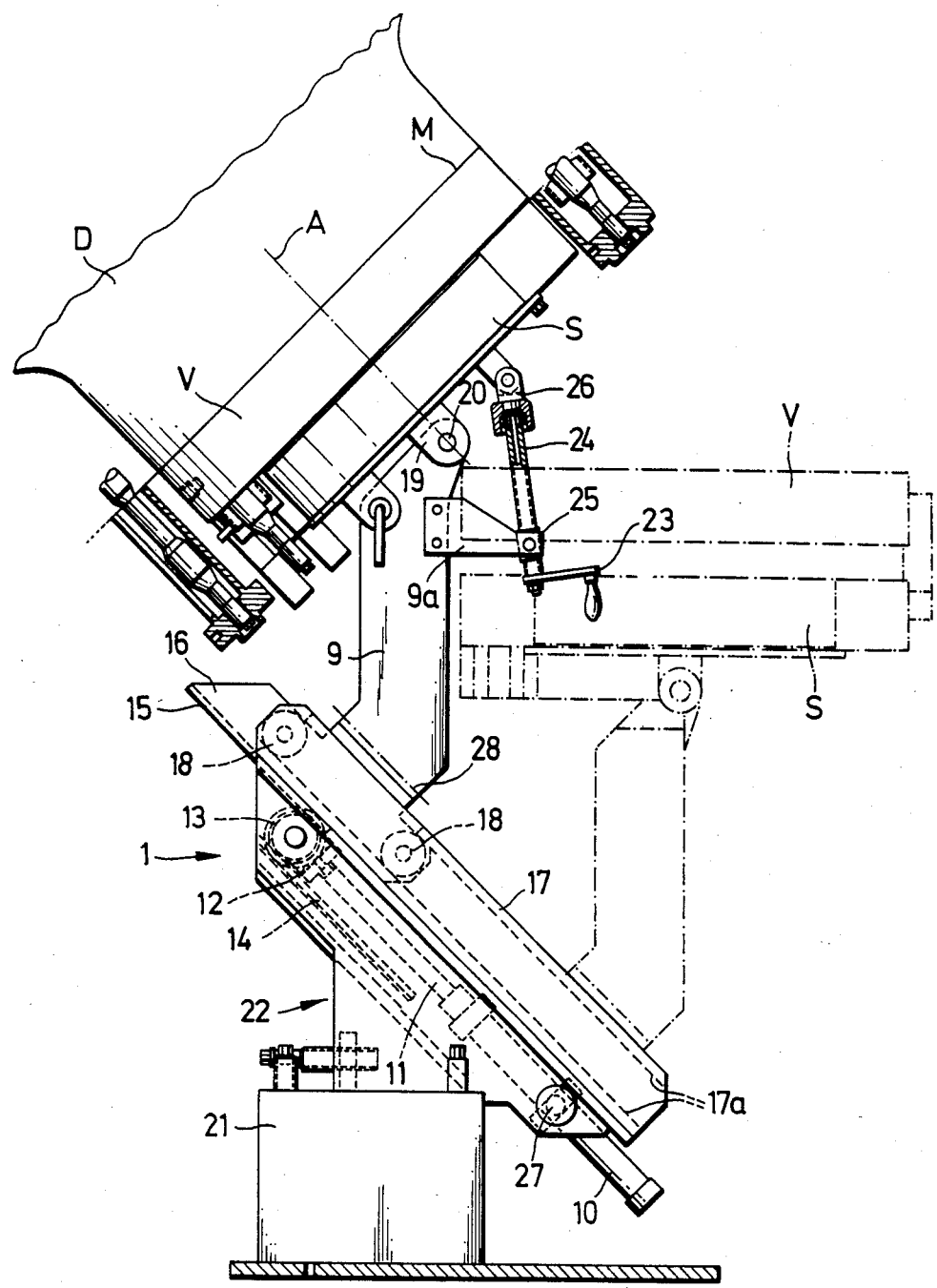

MANIPULATOR FOR COVER CLOSURE MEMBERS

BACKGROUND TO THE INVENTION

1. Field of the Invention

The invention relates to a manipulator for parts which are to be moved during the opening and closure of an orifice provided with a cover, in particular for manipulating a screw tightening device and/or the cover, especially during closure of the manholes of pressure vessels, predominantly in steam generators, with a support which is adjustable by means of a driving device in or on a guide parallel to the central axis of the orifice.

2. Description of Prior Art

In such devices, the support is normally the part which performs the actual transporting movement. The load, that is the cover and a screw tightening device, can be held by an additional take-up device located on or at the support.

With known designs of these devices, the driving mechanism usually has a member which acts directly on the support and moves together with the support over the same path, for example a spindle or the piston rod of a piston-and-cylinder unit. This often necessitates considerable space for the arrangement of the respective parts and their possibilities of movement. Problems arise because the space available is very restricted in many applications of such devices.

SUMMARY OF THE INVENTION

An object of the invention is to rectify existing deficiencies and problems and to achieve a compact design with the simplest construction for a manipulator of the type mentioned at the outset.

For this purpose, the invention provides a path-translating transfer device or transmission between the driving device and the support. This means that the path which a member of the driving device has to perform (stroke length) is shorter than the resultant path of the support. Favorable conditions for the arrangement and space requirement of the driving device are thus created and this also has an advantageous effect on the entire design of the manipulator, its movability, and its applications.

Path translation (multiplication) in a ratio of 1:2, in particular, is proposed. However, other values are also feasible.

The transmission can comprise flexible tension members such as cables or chains which are guided over an arrangement of pulleys, chain wheels, or the like, corresponding to the desired translation.

In an advantageous design, the transmission comprises at least one toothed wheel mounted freely rotatably in a bearing member or the like, which toothed wheel simultaneously engages into a toothed rack which is stationary with respect to the guide means for the support and into a toothed rack connected to the support, the bearing member or the like being movable by means of the driving device.

The driving device is advantageously a piston-and-cylinder unit which can be actuated by a pressure medium, optionally a double-acting unit. Further devices can also be considered, in particular with parts which can be moved by electric motors, for example with a spindle or the like which can be adjusted in straight lines.

Further details, features and advantages of the invention will berevealed by the following explanation of an embodiment, by the associated drawing, and by the claims.

BRIEF DESCRIPTION OF THE DRAWING

The drawing shows a manipulator in a side view, in conjunction with a pressure vessel.

DESCRIPTION OF PREFERRED EMBODIMENT

The manipulator, which is designated overall by the reference numeral 1, serves for the handling of parts which have to be moved during the opening and closure of a manhole orifice M of a pressure vessel D, for example a steam generator in a nuclear power station. Only the portion of the pressure vessel containing the orifice is illustrated. The orifice M is closed by a cover V which is fixed in known manner with screw-threaded bolts and nuts which are screwed thereon. The screw-threaded bolts can be tightened by means of a device S before the fixing nuts are screwed down. Various designs of such screw tightening devices are known.

The manipulator 1 has a lower frame 21 which can be designed to meet the respective requirements and can be stationary or movable. The lower frame 21 bears an attachment 22 which has a guide means 17 for a support 16. The guide means 17 is inclined to the horizontal such that it runs parallel to the central axis A of the orifice M.

In an advantageous embodiment, the guide means 17 comprises two guide tracks 17a, in particular in the form of facing recesses, groove profiles, or the like, which are arranged at a distance from one another, while two wheels or rolls 18 which run in the guide tracks 17a are provided on the support 16 on each side. The support 16 is provided with an arm-shaped holder 9 which is designed at its end for pivotally taking up the screw tightening device S. In the embodiment illustrated, the screw tightening device S has on its underside a fork-shaped attachment 19 which surrounds the end of the holder 9, a pivot pin 20 being inserted through passages in these parts.

The screw tightening device S can be adjusted in angle relative to the holder 9, in particular from the operating position shown in solid lines (in which its central axis coincides with the central axis A of the orifice M) into a horizontal rest position indicated by dot-dash lines, and vice versa, by means of a spindle mechanism 24 which is to be actuated by a crank handle 23 and whose nut 25 is articulated on a cantilever arm 9a of the holder 9 and whose bearing head 26 is connected via a pivot joint to the screw tightening device S at a point lying outside its center. This angular adjustment can be carried out together with the cover V or without it, as illustrated.

A hydraulic piston-and-cylinder unit 10, which extends approximately in the longitudinal central plane of the attachment 22 and is held thereon in journal bearings 27 or the like, is provided as a driving mechanism for moving the support 16 in its guide means 17 in the embodiment illustrated. A bearing member 12 with a toothed wheel 13 mounted freely rotatably therein is located at the end of the piston rod 11 of the unit 10. The bearing member 12 engages, on the one hand, in a toothed rack 14 which is fixed in the attachment 22 also approximately in the longitudinal central plane thereof in the region below the piston rod 11 and, on the other hand, in a toothed rack 15 arranged on the underside of the support 16. As a result, the path covered by the support 16 is twice as great as the path covered by the piston rod 11.

The holder 9 can be fixed on the support 16 in such a way that it can easily be removed from it. The design can also be such that the holder 9 can be conveyed relative to the support 16 from an operating position projecting from the support 16, as shown in the drawing, into a rest position demanding less space, and vice versa. For this purpose, the holder 9 can be pivotal in its entirety or merely in its upper portion relative to the support, for example about an axis indicated schematically by reference numeral 28. A suitable catch means is provided for securing the holder in its operating position.

All features mentioned in the foregoing description or illustrated in the drawings can be considered alone or also in combination as falling within the invention, insofar as this is permitted by the known state of the art.

We claim:

1. A manipulator for parts which are to be moved during the opening and closure of an orifice provided with a cover and having a central axis, comprising a guide extending parallel to the central axis of the orifice, a support movable along the guide, a driving device for moving the support along the guide, and a path-translating transmission between the driving device and the support.

2. A manipulator of claim 1, in which the path-translating transmission comprises a bearing member movable by means of the driving device and at least one toothed wheel mounted freely rotatably on the bearing member as path-translating transfer device, the toothed wheel simultaneously engaging a toothed rack which is stationary with respect to the guide and a toothed rack connected to the support.

3. The manipulator of claim 1, in which the driving device comprises a piston-and-cylinder unit actuable by a pressure medium.

4. The manipulator of claim 1, further comprising at least one arm-shaped holder provided on the support and having an end adapted for pivotally taking up a screw tightening device.

5. The manipulator of claim 4 in which the holder is removable from the support.

6. The manipulator of claim 4, in which the holder is movable relative to the support between an operating position projecting from the support and a rest position demanding less space.

* * * * *